Dec. 14, 1943.   D. I. DILWORTH   2,336,533
APPARATUS FOR COATING PIPE AND THE LIKE
Filed June 13, 1941   4 Sheets-Sheet 3
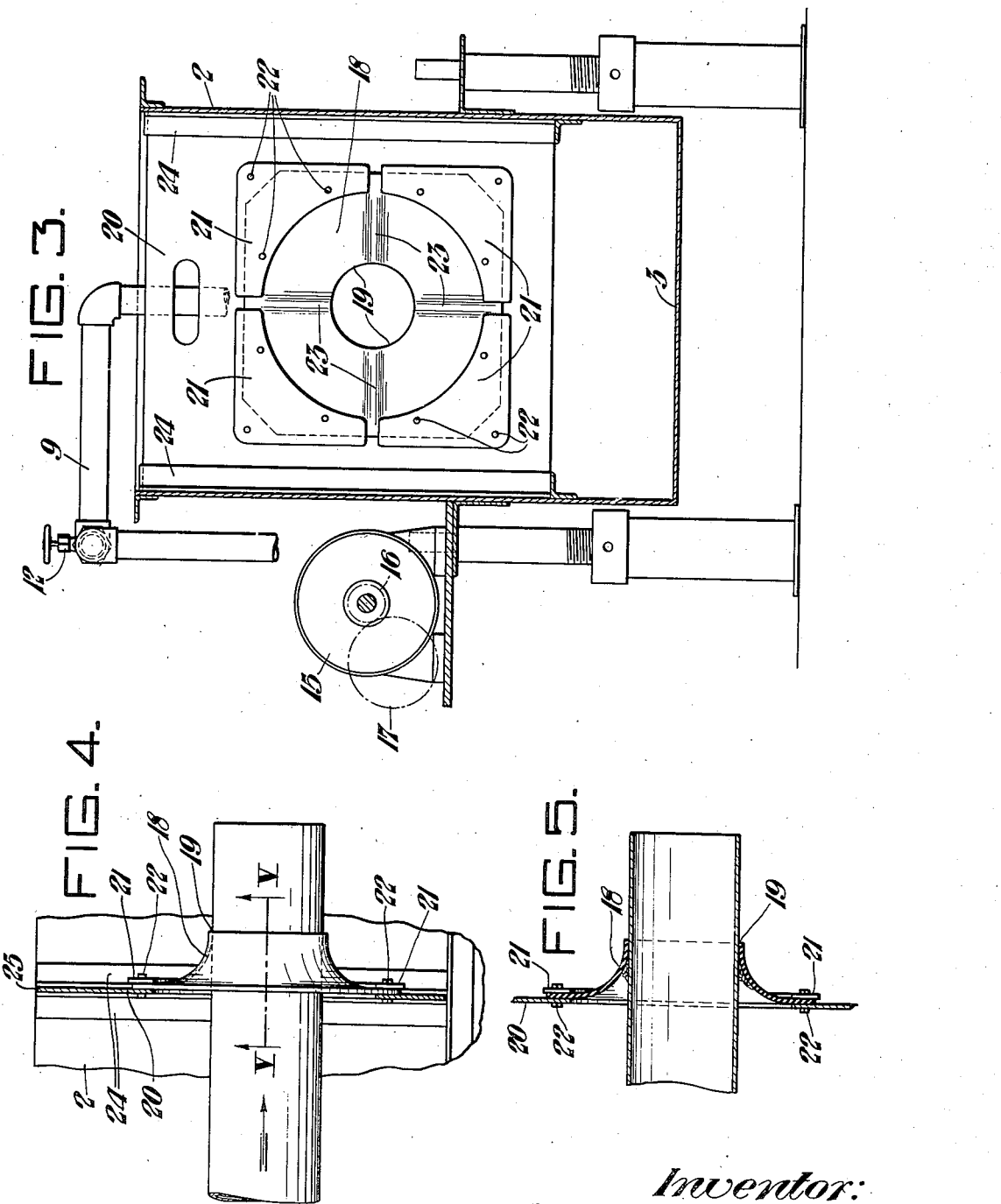
Inventor:
DAVID I. DILWORTH,
by: John E. Jackson
his Attorney.

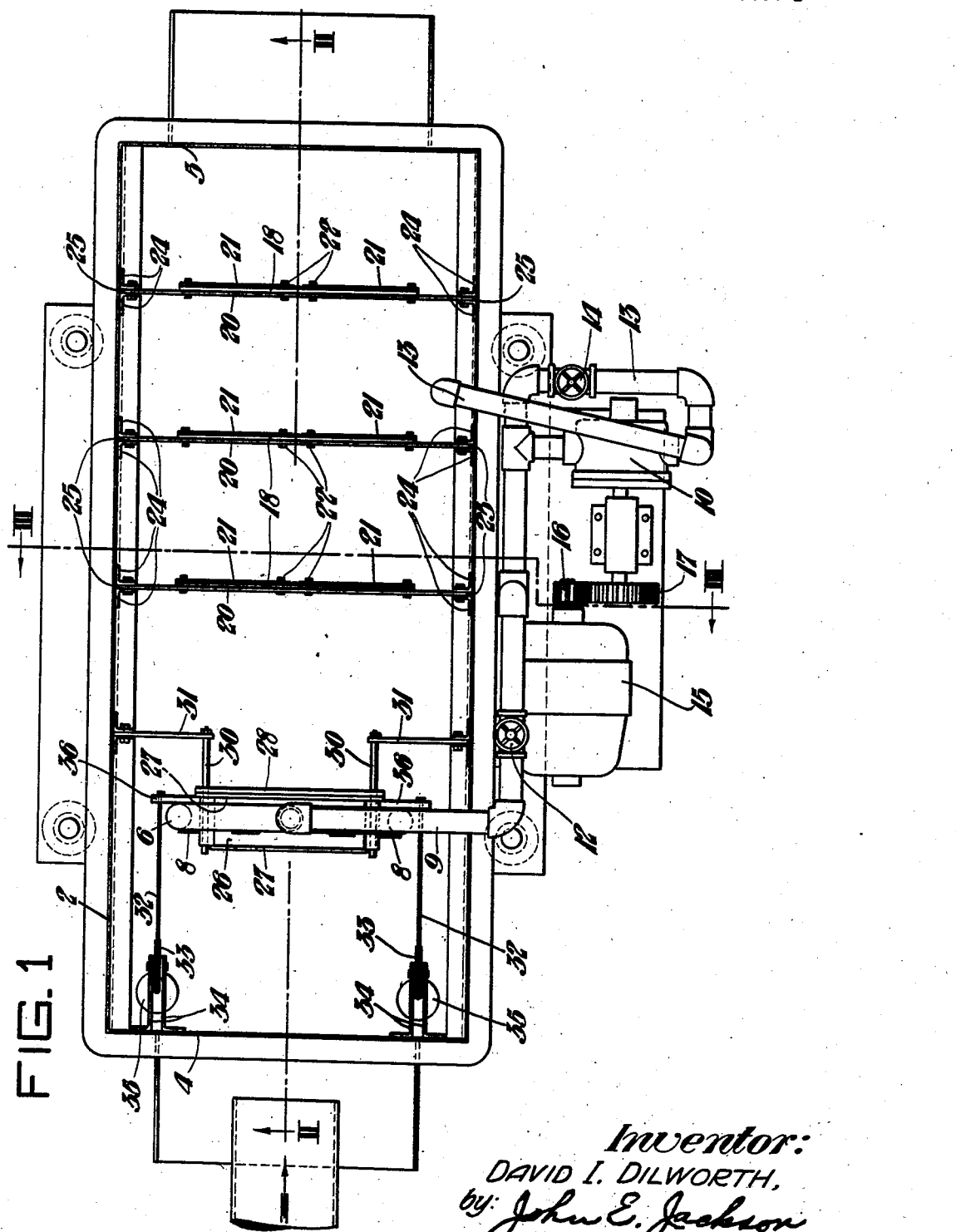

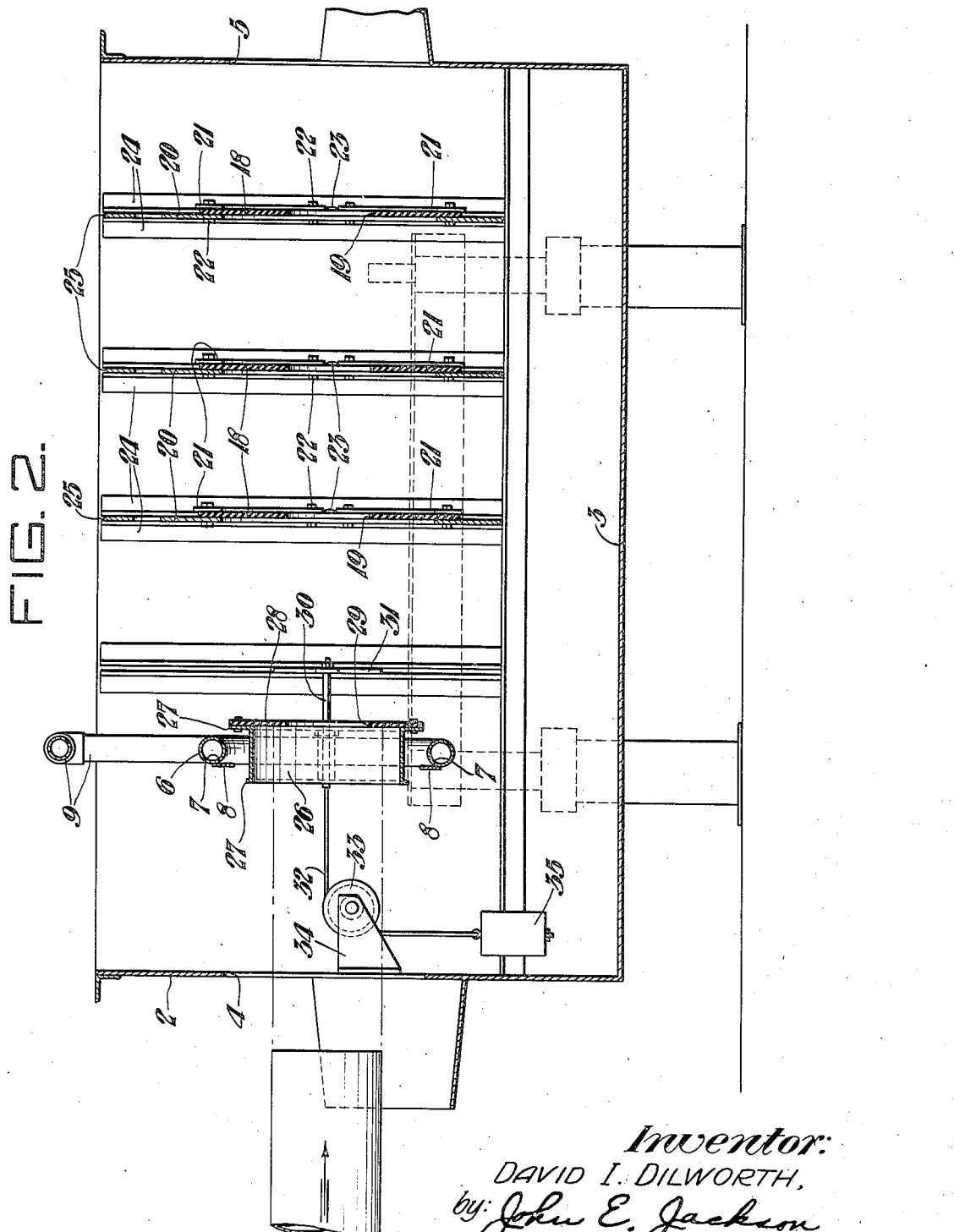

Dec. 14, 1943.   D. I. DILWORTH   2,336,533
APPARATUS FOR COATING PIPE AND THE LIKE
Filed June 13, 1941   4 Sheets-Sheet 4
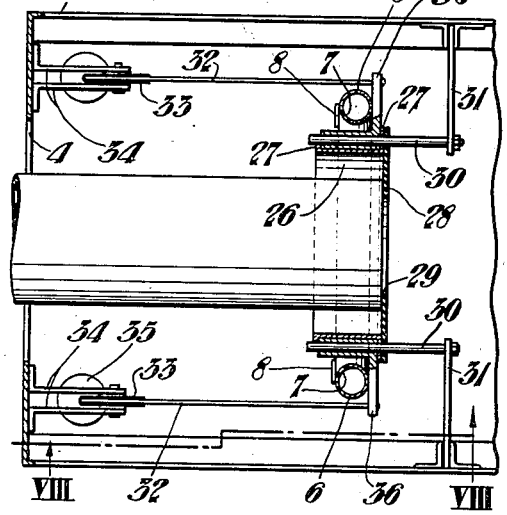
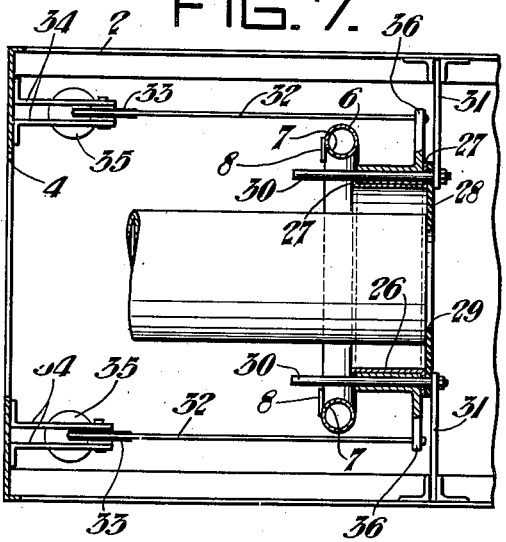
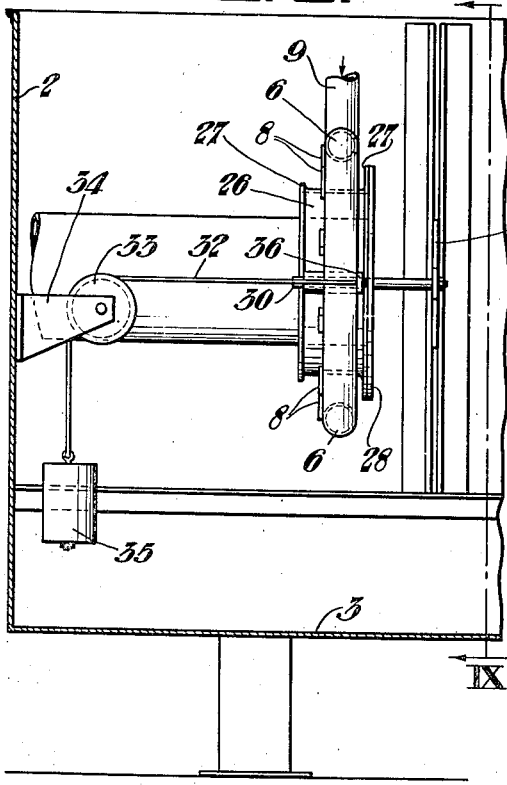
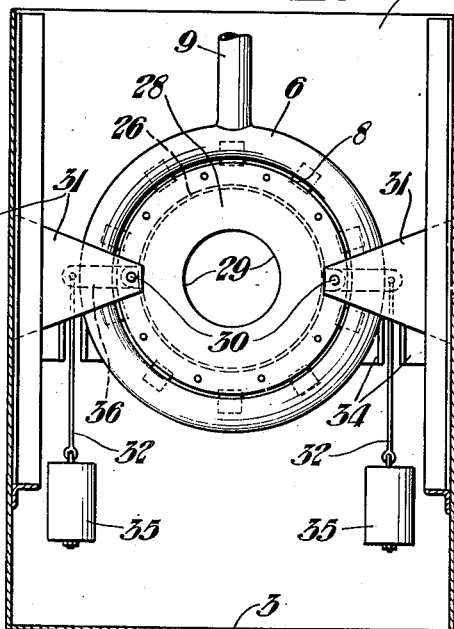
Inventor:
DAVID I. DILWORTH,
by: John E. Jackson
his Attorney.

Patented Dec. 14, 1943

2,336,533

UNITED STATES PATENT OFFICE 2,336,533

APPARATUS FOR COATING PIPE AND THE LIKE

David I. Dilworth, McKeesport, Pa., assignor to National Tube Company, a corporation of New Jersey Application June 13, 1941, Serial No. 397,963

7 Claims. (Cl. 91—30)

This invention relates to the coating of metallic pipe and other tubular articles and, particularly, to an improved apparatus for coating the same.

In the manufacture of tubular metallic articles such as pipe, it is desirable to apply a coating of a suitable protective material, usually oil, to the outer surface thereof after all of the rolling and sizing operations have been performed thereon so as to protect the same from the elements whereby consequent rusting and corrosion are prevented.

Various types of devices and apparatus have been suggested and used for applying such protective coating to the pipe. While some of these proposed devices have been to a certain extent satisfactory, others have been a total failure and expensive to maintain. Furthermore, most of the coating machines or devices heretofore proposed and used did not apply an even coating to the surface of the pipe and the coating was not properly impregnated into the outer surface so as to fill any voids therein and crevices existing on the surface thereof.

Accordingly, it is one of the objects of the present invention to provide an improved apparatus for coating metallic pipe and the like which is simple and inexpensive in its construction and, at the same time, one which is effective and efficient in its use, whereby the pipe is evenly coated so as to provide a smooth finish thereon.

It is another object of the invention to provide an improved apparatus for coating metallic pipes and the like wherein the coating means not only acts to coat the exterior surface of the pipe but also acts as a wiper so as to remove any excess liquid therefrom.

It is a further object of this invention to provide an improved apparatus for coating metallic pipe and the like wherein there is provided a means for preventing the coating liquid from entering the interior of the pipe.

Various other objects and advantages of this invention will become more apparent during the course of the following specification and will be particularly pointed out in the appended claims.

In the accompanying drawings there is shown, for the purpose of illustration, one embodiment which my invention may assume in practice.

In these drawings:

Figure 1 is a plan view of the improved pipe-coating apparatus of my invention;

Figure 2 is a section taken on line II—II of Figure 1;

Figure 3 is a section taken on line III—III of Figure 1;

Figure 4 is a detail view of one of the yieldable diaphragms showing it substantially in the position it will assume when a pipe is passing therethrough;

Figure 5 is a section taken on line V—V of Figure 4;

Figure 6 is a plan view partly in section of the improved means incorporated with my apparatus for preventing the coating liquid from entering the interior of the pipe, showing the same in its normal position;

Figure 7 is a similar view of the means for preventing the coating liquid from entering the interior of the pipe showing it in the position it will assume when the pipe is passing therethrough and being coated;

Figure 8 is a section taken on line VIII—VIII of Figure 6; and

Figure 9 is a section taken on line IX—IX of Figure 8.

Referring more particularly to the drawings, the improved apparatus of my invention for coating metallic pipe and other tubular material is shown incorporated with a conventional type pipe-coating tank. Such a tank comprises generally a longitudinally extending body member 2 having a reservoir 3 arranged in the bottom thereof for housing the coating liquid, which is usually oil. There is arranged in one of the end walls of the tank or body member 2, a circular opening 4 for delivering the pipe to be coated into the body member, and there is arranged directly opposite the opening 4 in the opposite end of the body member or tank, an opening 5 for delivering the pipe from the tank after it has been coated.

According to the present invention, there is arranged within the body member or tank 2, adjacent the opening 4 at the entry side of the tank, an annular tubular or ring member 6 preferably made from a pipe bent to a circular shape and having a plurality of spaced apart perforations or jets 7 arranged therein around the inner periphery thereof through which the coating liquid is adapted to issue therefrom. Directly opposite each of the jets 7 there is arranged preferably a small rectangular-shaped plate 8 which is preferably welded to the side of annular member or ring 6. The coating liquid is delivered from the annular member 6 through the perforations or jets 7, and is adapted to strike against the rectangular plates 8 arranged opposite each of the perforations so as to provide a uniformly thin sheet of coating liquid which is distributed evenly over the entire outer surface of the pipe to be coated as the pipe passes through the annular member.

The annular member 6 is connected by means of a pipe line 9 to a pump 10, and there is preferably arranged in the line 9 a gate valve 12. There is arranged with the pump 10 a pipe line 13 which extends into the reservoir 3 of the tank and there is positioned in the pipe line 13 preferably a relief valve 14. The pump 10 is adapted to be driven by means of a motor 15 through the action of gears 16 and 17. It is, of course, the purpose of the pump 10 to pump the coating liquid from the reservoir 3 through the pipes 13 and 9 into the annular member 6 from which it issues forth through the perforations or jets 7.

Within the body member or tank 2 there is arranged at spaced apart intervals a plurality of yieldable diaphragm-like members 18 which are preferably made of rubber or may be made of any other suitable yieldable material. In substantially the center of each of the diaphragms there is arranged a hole or restricted opening 19 having a diameter which is slightly less than the outer diameter of the pipe to be coated. Each of the diaphragms 18 is preferably mounted upon a removable wicket-like member 20 and is securely held thereon preferably by means of a plurality of clamping plates 21, four in the present instance, and bolts 22. The bolts 22 are pulled up tightly so that those portions 23, about ¾ of an inch in width, of each of the diaphragms arranged between the clamping plates 21 tend to distend between the plates as shown in Figure 3 of the drawings. The yieldable material of the diaphragm is forced outwardly between the clamping plates and, consequently, the material of the diaphragm tends to thicken at those portions 23 disposed between the same. Each of the thickened portions 23 takes the form substantially of a rib with the ribs running radially towards the center of the diaphragm. Thus, it will be seen that the diaphragms lose their original flat condition when clamped in the wicket members and take the form of a substantially warped conical shape.

The wicket-like members 20 are held in position in the body member or tank 2 preferably by a plurality of pairs of oppositely disposed spaced apart angle-iron members 24 which are suitably attached to the vertical inner side walls of the body member. The angle-iron members of each pair are spaced apart slightly more than the thickness of the wicket members so as to provide guideways 25 therebetween for housing the edges of the wicket members. That is, the wicket-like members 20, together with the diaphragms 18 carried thereby, are disposed in a vertical position in the body member 2 in the guideways 25 provided by the angle-iron members 24 and can be easily and quickly removed from position therein by sliding the same upwardly through the guideways 25 and out of the tank.

There is movably arranged in the tank and within the annular member 6, and concentric therewith, a cylindrical sleeve-like member 26 having a flange 27 arranged at each end thereof. On the inner side of the sleeve-like member there is suitably mounted a diaphragm-like member 28 similar to the diaphragms 18, having an opening 29 arranged therethrough which is also slightly less in diameter than the outer diameter of the pipe to be coated. The sleeve-like member 26, together with the diaphragm 28 carried thereby, is mounted for horizontal movement, preferably on a pair of diametrically opposed rails or guide members 30. The rails or guide members 30 are preferably mounted on a pair of plate-like stop members 31 secured to the side walls of the tank. There is connected to the sleeve-like member 26 preferably a pair of oppositely disposed flexible members such as ropes 32 which extend over pulleys 33 carried by brackets 34 mounted on the inner side of the end wall of the tank, and there is arranged on the lower end of the flexible members 32 a counterweight 35.

The apparatus of my invention operates in the following manner. The pipe to be coated is delivered through the opening 4 in the entry side of the tank 2 and as it passes into the tank, it moves through the sleeve-like member 26 and abuts against the diaphragm 28 carried thereby, as shown in Figures 6 and 8 of the drawings. Upon further forward movement of the pipe into the tank, the sleeve-like member 26 is moved forwardly on the rails 30 against the action of the counterweights 35 until the sleeve-like member strikes the plate-like members 31, which act as a stop, at which time any further movement of the sleeve-like member 26 in that direction is arrested, as shown in Figure 7 of the drawings. Due to the fact that the sleeve-like member cannot further move in its forward direction, the pipe, in bearing against the inner wall of the diaphragm 28 carried by the sleeve-like member 26, forces the diaphragm outwardly and the pipe passes through the restricted opening 29 thereof. It will be understood that during the passage of the pipe into the tank, the coating liquid is issuing forth from the perforations or jets 7 of the annular member 6, with the plates 8 directing the coating liquid radially inwardly toward the center of the annular member in a uniform spray. Thus, it will be seen that the coating liquid cannot reach the extreme end of the pipe as it enters the machine, due to the fact that the sleeve member 26 acts as a shield and the coating liquid strikes the outer surface thereof and drops therefrom into the reservoir 3 in the bottom of the tank. It is the purpose of the flanges 27 of the sleeve-like member 26 to prevent the coating liquid from flowing thereinto. Thus, it will be seen that the sleeve-like member 26, together with the diaphragm 28 carried thereby, prevents the coating liquid from entering the interior of the pipe at the forward end thereof.

After the sleeve-like member 26 has moved to position against the plate-like or stop members 31, it will be seen that the coating liquid is permitted to be sprayed or delivered to the exterior surface of the pipe by the ring member and that the sleeve-like member will remain in position against the stop members 31 until the pipe has entirely passed through the restricted opening of the diaphragm 28. After the pipe has passed therethrough, the sleeve-like member 26, together with the diaphragm 28 carried thereby, will be moved to its initial or normal position within the annular member 6 through the action of the counterweights 35 and the flexible members 32. There is carried, preferably by the sleeve-like member 26, a pair of diametrically opposed projecting portions 36 which are adapted to cooperate with the annular member 6 to maintain the sleeve-like member in its normal position.

After the pipe is further moved into and through the tank, it passes successively through the openings 19 of each of the diaphragms 18 and is delivered from the tank through the delivery opening 5 in the opposite end thereof. As the pipe passes through the diaphragms 18, it stretches or distorts each of them so that the diaphragms will assume a substantially frusto-conical, or funnel, shape, as shown in Figures 4 and 5 of the drawings, which results in a portion of each of the diaphragms being dragged along the outer surface of the pipe. The area of contact of the diaphragm on the surface of the pipe depends on the gage thickness and yieldableness of the diaphragms, the amount of restriction of the openings 19 arranged therein, and the relative diameters of the diaphragms and the pipe. As the pipe passes to the diaphragms, the coating material, of course, has been sprayed on the outer surface thereof by the annular member 6 and the coating liquid is caught in the funnel approach of the diaphragms and is dragged along the surface of the pipes and is forced into the surface of the pipe due to the inherent elasticity of the diaphragms. Such action of the diaphragms causes the coating liquid to be impregnated minutely into the outer surface of the pipe and into the minute and microscopic voids and crevices existing upon the surface of the pipe and the scale thereon. It will also be seen that the diaphragms remove minute trapped air bubbles from the coating liquid. It has been found that an actual vacuum is provided at the inner surface of this so-called funnel provided by the diaphragms, and the coating, while entering the funnel, is turbulently mixed thereby, resulting in a burble point at which any excess oil is dropped into the reservoir of the tank at the approach side of the funnel.

There is shown in the present instance the use of four diaphragms, but it will be understood that one or more diaphragms, as desired, may be used to obtain the desired coating of the pipe. The diaphragms can be changed for different sized pipes to be coated by removing the wicket members 20 and replacing the diaphragms 18 therein with the proper size diaphragms. The advantage of using a plurality of diaphragms is to control the amount of coating liquid deposited upon the surface of the pipe and to more thoroughly impregnate it into the surface thereof. It has been found that the use of a plurality of diaphragms produces a greater and more compact and uniform deposit of coating on the surface of the pipe than the use of a single diaphragm.

It will be seen that the diaphragms 18 not only act to force the coating liquid into the outer surface of the pipe, but also act as a wiper to simultaneously wipe any excess coating liquid from the surface of the pipe as it passes therethrough, thereby not only providing a suitable coating for the pipe, but also a pipe which is substantially free from flowing coating liquid and, at the same time, recovering the excess coating liquid so as to provide a substantial saving in the amount of coating liquid being used and, consequently, a saving in the coating process.

While I have shown and described one specific embodiment of my invention, it will be understood that this embodiment is merely for the purpose of illustration and description and that various other forms may be devised within the scope of my invention, as defined in the appended claims.

I claim:

1. Apparatus for coating metallic pipe and the like including a body member, means carried by said body member for applying a liquid coating material to the pipe to be coated as it passes therethrough, means carried by said body member adjacent the liquid applying means to prevent the coating liquid from entering the end of the pipe as it passes therealong, said last mentioned means being mounted for limited movement on said body member and having means carried thereby which the pipe engages as it passes along whereby the coating liquid is prevented from entering the forward end of the pipe while the same is in the vicinity of said liquid apply means, and at least one yieldable diaphragm-like member carried by said body member rearwardly of said last mentioned means and in the path of movement of the pipe having a hole arranged therein with the diameter thereof being slightly less than the outer diameter of the pipe to be coated, said pipe adapted to pass through the hole in said diaphragm and to distort the same as it passes therethrough so that the diaphragm will assume a substantially frusto-conical shape whereby the diaphragm forces the liquid coating material into the outer surface of the pipe and simultaneously removes any excess coating liquid therefrom.

2. Apparatus for coating metallic pipe and the like as defined in claim 1 wherein the means for preventing the coating liquid from entering the end of the pipe consists of a sleeve-like member arranged directly opposite the liquid coating applying means, and a yieldable diaphragm member arranged over the forward end of said sleeve-like member having a hole arranged therein slightly less in diameter than the outer diameter of the pipe to be coated and through which the pipe is adapted to pass.

3. Apparatus for coating metallic pipe and the like as defined in claim 1 wherein the means for preventing the coating liquid from entering the end of the pipe consists of a sleeve-like member arranged directly opposite the liquid coating applying means through which the pipe to be coated is adapted to pass, said sleeve-like member having a flange arranged around the periphery thereof adjacent each end of the same.

4. Apparatus for coating metallic pipe and the like including a longitudinally extending body member, a reservoir arranged in the bottom of said body member for holding a supply of coating liquid, an annular tubular member arranged in said body member having a plurality of perforations arranged therein around the inner periphery thereof through which the coating liquid is adapted to pass to the exterior surface of the pipe to be coated as it passes through said annular tubular member, means for conveying the coating liquid from said reservoir to said annular member, a reciprocably mounted member positioned adjacent said annular member having means carried thereby which is engaged by the end of the pipe as it passes along so as to prevent the coating liquid from entering the forward end of the pipe at least one yieldable diaphragm-like member arranged in said body member beyond both said annular tubular member and said reciprocably arranged member having a hole arranged therein with the diameter thereof being slightly less than the outer diameter of the pipe to be coated, said pipe adapted to move said reciprocable member as it passes therethrough and adapted to pass through the hole in said diaphragm and to distort the same as it passes therethrough so that the diaphragm will assume a substantially frusto-conical shape whereby the diaphragm forces the liquid coating material into the outer surface of the pipe and simultaneously removes any excess coating liquid therefrom, and means for moving said reciprocable member to its normal position after the pipe has passed therethrough.

5. Apparatus for coating metallic pipe and the like including a longitudinally extending body member, a reservoir arranged in the bottom of said body member for holding a supply of coating liquid, an annular tubular member arranged in said body member having a plurality of perforations arranged therein around the inner periphery thereof through which the coating liquid is adapted to pass to the exterior surface of the pipe to be coated as it passes through said annular tubular member, means for conveying the coating liquid from said reservoir to said annular member, means arranged within said annular tubular member for preventing the coating liquid from entering the end of the pipe as it passes therethrough, said last mentioned means being mounted for limited movement within said annular tubular member and having means carried thereby which the pipe engages as it passes along whereby the coating is prevented from entering the forward end of the pipe while the same is in the vicinity of said annular tubular member, and at least one yieldable diaphragm-like member arranged in said body member beyond rearwardly of said annular tubular member and in the path of movement of the pipe having a hole arranged therein with the diameter thereof being slightly less than the outer diameter of the pipe to be coated, said pipe adapted to pass through the hole in said diaphragm and to distort the same as it passes therethrough so that the diaphragm will assume a substantially frusto-conical shape whereby the diaphragm forces the liquid coating material into the outer surface of the pipe and simultaneously removes any excess coating liquid therefrom.

6. Apparatus for coating metallic pipe and the like as defined in claim 5 wherein the means arranged in the annular tubular member for preventing the coating liquid from entering the end of the pipe consists of a movable sleeve-like member concentrically arranged within said annular member through which the pipe to be coated is adapted to pass, said sleeve-like member having a flange arranged around the periphery thereof adjacent each end of the same.

7. Apparatus for coating metallic pipe and the like including a body member, means carried by said body member for applying a liquid coating material to the pipe to be coated as it passes therethrough, a reciprocably arranged member mounted adjacent said liquid applying means for preventing the coating liquid from entering the end of the pipe as it passes therealong, a yieldable diaphragm member carried by said reciprocably arranged member having a hole therethrough which the pipe is adapted to pass, and at least one other yieldable diaphragm member carried by said body member having a hole therethrough through which the pipe is adapted to pass with the holes through both of said diaphragm members being in alignment with each other, said diaphragm member adapted to force the liquid coating material into the outer surface of the pipe and simultaneously to remove any excess coating liquid therefrom.

DAVID I. DILWORTH.